United States Patent

[11] 3,622,647

[72] Inventors Matthew A. McMahon;
　　　　　　　Alfred Arkell, both of Wappingers Falls, N.Y.
[21] Appl. No. 857,199
[22] Filed Sept. 11, 1969
[45] Patented Nov. 23, 1971
[73] Assignee Texaco Inc.
　　　　　　　New York, N.Y.

[54] MANUFACTURE OF ALKENE FROM ALKANE VIA BORON ESTERS
　　　7 Claims, No Drawings

[52] U.S. Cl. .................................................. 260/682,
　　　　252/432, 260/462 A, 260/666 A, 260/677 A
[51] Int. Cl. ................................................. C07c 1/20,
　　　　C07b 3/00, C07f 5/04
[50] Field of Search ...................................... 260/682,
　　　　677 A, 462 OX, 666 A

[56] References Cited
　　　　UNITED STATES PATENTS

| | | | |
|---|---|---|---|
| 3,524,891 | 8/1970 | Cahn | 260/682 X |
| 3,253,013 | 5/1966 | Cerrione | 260/462 |
| 3,260,769 | 7/1966 | Marshall | 260/682 |
| 3,317,581 | 5/1967 | Becker | 260/462 |
| 3,346,614 | 10/1967 | Starks et al. | 260/462 |
| 3,409,698 | 11/1968 | Illingworth et al. | 260/682 |
| 2,696,304 | 12/1954 | Gilmore | 260/677 A |
| 1,947,989 | 2/1934 | Hellthaler | 260/462 |
| 2,721,180 | 10/1955 | Lawrence et al. | 260/462 |
| 3,109,864 | 11/1963 | Fox et al. | 260/631 |
| 3,214,449 | 10/1965 | Kirshenbaum et al. | 260/406 |
| 3,245,449 | 3/1966 | Winnick | 260/462 |
| 3,375,265 | 3/1968 | Fetterly et al. | 260/462 |
| 3,399,035 | 8/1968 | Broich et al. | 260/462 |
| 3,410,913 | 11/1968 | McMahon et al. | 260/632 |
| 3,454,617 | 7/1969 | Fischer et al. | 260/462 |

Primary Examiner—Delbert E. Gantz
Assistant Examiner—G. E. Schmitkons
Attorneys—K. E. Kavanagh and Thomas H. Whaley ABSTRACT: Manufacture of alkene from alkane, said alkene of an equal number of carbons as its alkane precursor, comprising contacting alkane with oxygen in the presence of a boric acid at an elevated temperature, spearating the resultant alkylborate esters from the reaction product, pyrolyzing said alkylborates in an inert atmosphere, preferably in the presence of a methanol or trimethylborate and recovering the formed alkene from the pyrolysis mixture, said recovery preferably including contacting said formed alkene with silica gel.

3,622,647

MANUFACTURE OF ALKENE FROM ALKANE VIA BORON ESTERS

BACKGROUND OF INVENTION

The process of the invention is in the area of art relating to the conversion of paraffins into alkenes.

In the past, many methods have been devised for the conversion of paraffins into olefinic compounds. One method calls for the thermal or catalytic cracking of higher molecular weight paraffins, normally waxes, to form alkenes. Although this method satisfactorily produced alkenes, it has the disadvantage of producing alkene mixtures of varying carbon chain lengths even though the starting alkane is a single carbon length. This undesirably requires complex fractionation of the resultant olefinic product if particular chain length materials are desired. Further, if a specific chain length olefin is desired its production is only a small portion of the total olefin product. Another prior method calls for the direct catalytic dehydrogenation of paraffins to olefins. Although this catalytic dehydrogenation does produce olefins in satisfactory yields, it has the disadvantage of requiring an alkylation step to permit separation of the unreacted n-paraffin stream for recycle. Another method calls for chlorinating paraffins followed by dehydrochlorination. The chlorine method has the obvious disadvantage of requiring the handling of highly toxic chlorine gas and hydrogen chloride byproduct. Still another method calls for the polymerization of ethylene by utilizing a Zeigler-type catalyst. The drawback of this method is that only even carbon atoms are produced and also a relatively large yield of nonuseful high molecular weight and low molecular weight olefins are formed.

SUMMARY OF INVENTION

We have discovered and this constitutes our invention a method of producing an n-alkene or cycloalkene from an n-alkane or cycloalkane respectively wherein essentially all of the alkene product is of a chain length equal to the chain length of the paraffin parent, therefore, there is no need to employ complex separation procedure. Further, special material handling is not required since highly toxic materials such as chlorine are not employed.

More specifically, the method of the invention comprises contacting an n-paraffin or cycloalkane of from $C_6$ to $C_{20}$ carbons with oxygen in the presence of ortho- or metaboric acid at an elevated temperature, separating the resultant n-alkylborate or cycloalkylborate esters from the inorganic boric acid byproduct and unreacted boric acid, pyrolyzing the recovered alkylborates in an oxygen-free atmosphere and in the absence of catalyst and recovering the resultant n-alkene or cycloalkene of a carbon chain length equal to the starting material. As another embodiment of the invention, the pyrolysis preferably takes place in the presence of methanol or trimethylborate. Still another embodiment is preferably contacting the crude olefinic product with silica gel to effectively remove oxygenate impurities therefrom via absorption.

Hereinbefore and hereinafter by the terms "alkane" (paraffin), "alkene," cycloalkane and cycloalkene are included unless otherwise stated.

DETAILED DESCRIPTION OF THE INVENTION

In detail the method of the invention comprises introducing an alkane of from 6 to 20 carbons into an oxidation reactor maintained at a temperature between about 150° and 200°C. and above the melting point of the alkane reactant, together with oxygen in a ratio of alkane to oxygen of between about 1.10 and 10.1 and a boric acid selected from the group consisting of ortho- and metaboric acid in a mole ratio of alkane to boric acid of between about 15.1 and b 2.1. The alkane and boric acid ingredients may be either premixed and added to the oxidation zone in admixture or introduced into the reactor via separate streams. The oxygen-containing gas is passed through the oxidation advantageously at a rate of between about 0.1 and 0.6 cut.ft.$0_2$/lb. reaction mixture/hr. for about 2 to 7 hours. Preferably, the liquid oxidation reaction mixture is maintained in an agitated state. The oxidation product is either batchwise or continuously withdrawn from the reactor with excess oxygen normally taken off as overhead, the withdrawals being adjusted in the continuous procedure so that the quantity of materials in the oxidator is essentially constant. In any case, the amount of product withdrawn is generally between about 5 and 20 percent oxidized, however, the economics of yield versus oxidation time will determine the exact extent of oxidation.

The withdrawal oxygenated reaction mixture is forwarded to a separator where unreacted paraffin and all nonborated products such as ketone, keto carboxylic acid, lactones, carboxylic acids and the like are removed. The separation generally constitutes a vacuum distillation wherein the unreacted paraffins and other volatile nonborated products are taken off as overhead at elevated temperature under reduced pressure, e.g., between about 60° and 200° C. under between about 5 and 50 mm. Hg. pressure. The overhead can be hydrogenated and then recycled to the oxidation zone. The alkylborate ester intermediates are withdrawn as residue.

The separated alkylborate esters are forwarded to a pyrolyzing reactor which is maintained at temperature between about 200° and 400° C., normally at atmospheric or superatmospheric pressure (e.g., up to 50 p.s.i.g.), the pyrolysis taking place in the absence of catalyst and oxygen, in an inert atmosphere, e.g., nitrogen, with continuous removal of the formed crude alkene together with oxygenate impurity, usually as overhead. The boron byproduct is removed either continuously or batchwise as residue. To insure an oxygen free atmosphere and thereby prevent or reduce the formation of undesired oxidized byproduct, the reactor is generally swept with inert gas. Inert gas introduction may be continued during the entire pyrolysis, the inert gas aiding the continuous removal of the olefin product and the oxygen free condition. The inert gas is advantageously circulated in the pyrolysis reactor at a rate of between about 0.01 and 0.20 cu.ft./lb. borate ester/hr. if continuous inert gas introduction is employed. It is to be noted the absence of catalyst in the pyrolysis zone substantially facilitates product separation and such absence is only permitted by the particular combination of the inventive method.

The olefin product produced in the pyrolysis step corresponds to the carbon length of the paraffin introduced but is a random mixture of position isomers.

In order to promote the even distribution of heat throughout the reaction mixture in the pyrolysis zone and the separation of the products therefrom, the pyrolysis reactor is normally filled with standard-type packing such as Pyrex helixes, Pyrex beads, Raschig rings and the like. However, the use of packing eventually results in serious plugging problems and even without packing the pyrolysis reactor eventually becomes plugged. The cause of this is the boron byproduct is boric oxide which deposits as a solid on the packing and the walls of the reactor particularly in the area where the alkylborate enters the reactor. We have unexpectedly discovered that when a member selected from the group consisting of methanol or trimethylborate is introduced into the pyrolysis zone in a mole ratio of alkylborate ester intermediate to said member of between about 1:10 and 10.1, either in admixture with the alkylborate ester charge or concurrently therewith, the former preferred, the plugging problem is essentially eliminated since there is little or no solid boron compound coating formed in the pyrolysis reactor. The reason for this is not completely understood, but it is thought that the boric oxide reacts with methanol or trimelhylborate to form a vapor phase intermediate such as monomethylborate which trimerizes upon leaving the pyrolysis zone to give trimethoxyboroxine.

The formed crude olefin, normally recovered as overhead, can gel, purified by standard means such as fractional distillation or more preferably it is contacted with silica gel to remove oxygenate byproducts carried over from the oxidation zone. The quantity of silica gel employed is dependent on many factors such as rate or crude olefin flow, purity of olefin desired, effective surface area of silica gel and etc. The temperature of silica gel treatment is normally between about 25° and 50° C. and in any case above the melting point of the olefin. If it is desired to recover the oxygenates adsorbed by the silica gel. the silica gel is eluted with a solvent for oxygenates and the resultant elution solution is then fractionated and the oxgenates are recovered for use as is or are recycled to the hydrogenator together with the overhead from the oxidation zone for regeneration to n-paraffin and eventual reuse in the oxidation zone. Examples of suitable solvent for oxygenates are methanol, ethanol, isopropanol, diethyl ether, isopropyl ether, etc.

The trimethylboroxine byproduct, $(CH_3OBO)_3$ can be reutilized in the process by hydrolyzing the pyrolysis effluent with water, e.g. 65°–75° C. at about 5:1 volume of water to effluent for 1 hour to form an organic layer containing crude olefin and an aqueous phase containing boric acid and methanol. The aqueous phase is stripped to separate water and methanol from boric acid, the latter two being the decomposition products of the boroxine. The boric acid and methanol are then recycled for reuse in the process.

In regard to hydrogenation (if employed) of the organic byproduct from the oxidation and pyrolysis zone to upgrade them for recycle, said hydrogenation normally takes place at between about 180° and 320° C. under a hydrogen pressure of between about 200 to 2,000 p.s.i.g. in the presence of group VIII metal hydrogenation catalyst such as platinum, palladium, nickel rhodium, platinum black supported on inert material such as kieselguhr. Particularly suitable catalyst systems are 10–80 wt. percent Ni on kieselguhr, 0.5 wt. percent Pt on carbon and 5 wt. percent Rh on kieselguhr. Advantageously, the hydrogenation feed space velocity is between about 0.1 and 20 volume feed/volume catalyst and between about 0.1 and 10 cu. ft. hydrogen/lb. feed.

Examples of the paraffin reactants contemplated herein are cyclohexane, cyclooctane, dodecane, tridecane, hexadecane, eicosane, pentacosane, a mixture of $C_{10}$ to $C_{13}$ n-paraffins consisting of about 24 wt. percent decane, 46 wt. percent undecane, 27 wt. percent dodecane and 3 wt. percent tridecane; a mixture of $C_{11}$ to $C_{14}$ n-paraffins consisting of 35 wt. percent undecane, 38 wt. percent dodecane, 35 wt. percent tridecane and 2 wt. percent tetradecane and a mixture of $C_{13}$ to $C_{16}$ n-paraffins consisting of 3 wt. percent tridecane, 62 wt. percent tetradecone, 31 wt. percent pentadecane and 4 wt. percent hexadecane. From these paraffins the corresponding alkenes are respectively produced, namely a position isomeric mixture of cyclohexene, cyclooctene, dodecene, tridecene, hexadecene, eicosene, pentacosene; a mixture of $C_{10}$ to $C_{13}$ n-alkenes consisting of 24 wt. percent decene, 46 wt. percent undecene, 28 wt. percent dodecene and 3 wt. percent tridecene; a mixture of $C_{11}$ to $C_{14}$ n-paraffin consisting of 35 wt. percent undecene, 28 wt. percent dodecene, 35 wt. percent tridecene and 2 wt. percent tetradecene and a mixture of $C_{13}$ to $C_{16}$ n-paraffins consisting of 3 wt. percent tridecene, 62 wt. percent tetradecene, 31 wt. percent pentadecene and 4 wt. percent hexadecene.

The term "oxygen" hereinbefore and hereinafter encompasses oxygen containing gaseous mixtures. Examples of such mixtures are air and oxygen-inert gas mixtures, said mixtures containing between about 1 and 40 wt. percent oxygen. From a cost and reaction control standpoint air is the most preferred. The following equations further illustrate the method of the invention with R and R' representing n-alkyl and the product assumed an α-olefin:

I.—Oxidation:

(a) $RH + H_3BO_3 + O_2 \xrightarrow{heat} ROBO + H_2O \uparrow$

II.—Pyrolysis:

(a) $ROBO \xrightarrow{heat} R'CH=CH_2 + HOBO \uparrow$ (a') $2HOBO \xrightarrow{heat} B_2O_3 + H_2O \uparrow$
           solid III.—Pyrolysis in presence of (a) $CH_3OH$ or (b) $(CH_3O)_3B$:

(a) $ROBO \xrightarrow{heat} R'CH=CH_2 + HOBO \uparrow$ (a') $HOBO + 3CH_3OH \longrightarrow (CH_3OBO)_3 + 3H_2O$
                              $>150°C.$ (a'') $(CH_3OBO)_3 \xrightleftharpoons[>150°C.]{} 3CH_3OBO$ (b) $ROBO \xrightarrow{heat} R'CH=CH_2 + HOBO$ (b') $2HOBO \longrightarrow B_2O_3 + H_2O$ (b'') $B_2O_3 + (CH_3O)_3B \longrightarrow (CH_3OBO)_3$
                              $>150°C.$ (b''') $(CH_3OBO)_3 \xrightleftharpoons[<150°C.]{} 3CH_3OBO$ The following examples further illustrate the method of the invention but are not to be construed as limitations thereof.

EXAMPLE I

This example illustrates the first (oxidation) stage of the method of the invention.

To a 12-liter reactor fitted with a mechanical stirrer, gas inlet line ending with a sintered glass separator and a water trap, there was charged 1 kilogram of n-dodecane and 50 grams of orthoboric acid. The reactor is heated to a temperature of 175° C. and air is passed through the charge material at the rate of 1.5 liters/minute. At the end of the one-hour reaction period the reaction mixture is stripped at 1 mm. Hg to a pot temperature of 190° C. leaving 125 grams of crude n-monododecyl borate as residue.

EXAMPLE II

The procedure of example I was repeated except 1,000 grams of a $C_{10}$ to $C_{13}$ n-parraffin mixture were employed rather than n-dodecane, said mixture essentially comprising about 11 wt. percent decane, about 34 wt, percent undecane, about 26 wt. percent dodecane, and about 27 wt. percent tridecane. The final product was determined to be grams of crude n—$C_{10}$—$C_{13}$ monoalklborates.

EXAMPLE III

The procedure of example II was repeated with the exception that 60 grams of orthoboric acid were employed and the crude n—$C_{10}$—$C_{13}$ alkylborate product mixture weighed 103 grams.

EXAMPLE IV

This example illustrates the second stage of the method of the invention.

To a 300 ml. flask equipped with a thermometer, gas sparger, distillation head, a vertically mounted spiral condenser and a magnetic stirring bar, there was charged the monoalkylborate as prepared in examples I and II previously described. Dry nitrogen was passed over the surface of the charge at a rate of 500 ml./minute while it was being heated to 200° C. During this time stirring was instituted. When the temperature of 200° C. was attained which was usually about 45 minutes, the nitrogen introduction was ceased and the charge was then heated to the range of 250° to 300° C. during which time the product olefins distilled as they were formed. The pyrolysis usually required 1 to 3 hours depending on the heating rate and the amount of sample. Pyrolyses were usually taken to a maximum pot temperature of 330° C. at which time there was a solid cake in the pot and only a minimal amount of organic material. The head temperature ranged between 170° and 200° C. while the pyrolysis was in progress and the product olefins were removed as they were formed.

The test device and results are reported in table 1.

TABLE I

| Run No. | Alkyl borate source | Crude alkyl borate, grams | Product Olefin | Olefin, g. | Selectivity to olefin, percent |
|---|---|---|---|---|---|
| A | Ex. I | 125 | n-Dodecenes | 72.5 | 62 |
| B | Ex. I | 188 | do | 105 | 56 |
| C | Ex. I | 172 | do | 81.6 | 49 |
| D | Ex. II | 125 | n-$C_{10}$-$C_{13}$ alkenes | 73.5 | 61 |

EXAMPLE V

This example further illustrates the pyrolysis stage of the subject process.

The apparatus employed was that of example IV. To the 300 ml. reaction flask there was charged the n-$C_{10}$-$C_{13}$ alkylborates prepared in example III and dry nitrogen was passed over the borate surface at a rate of 500 ml./minute while the reaction mixture was being heated to 200° C. When 200° C. temperature was reached, the nitrogen was shut off. The heating usually takes about 45 minutes to reach 200° C. The temperature of the reactant charge was then increased to 250°–300° C. and the corresponding n-$C_{10}$-$C_{13}$ alkenes distilled as formed. The recovered crude alkenes were passed through a 50 ml. burette filled with about 6 inches (8.6 grams) of silica gel (size 12). The silica gel column was then washed with 25 ml. of pentane and the pentane washings and olefin filtrate were combined and pentane removed via distillation leaving the n-olefin product as residue. The column was washed with 25 ml. of dry ethyl ether and after removal of the dry ethyl ether elution mixture, the residue was determined to be an alkyl oxygenate mixture. The test data and results are reported below in table II:

TABLE II

| Run No. | Time of oxidation, hrs. | Alkyl borate, grams | Purified n-$C_{10}$-$C_{13}$ alkenes, g. | Oxygenates removed via silica gel, g. | Selectivity to $C_{10}$-$C_{13}$ alkene, percent |
|---|---|---|---|---|---|
| E | 4.0 | 105 | 50 | 6.6 | 48 |
| F | 1.1 | 65 | 36.4 | 4.4 | 65 |
| G | 2.0 | 102 | 49 | 3.1 | 57 |
| H | 1.4 | 126 | 73 | 7.1 | 52 |
| I | 2.1 | 100 | 54 | 5.5 | 56 |
| J | 2.6 | 100 | 52 | 15 | 55 |
| K | 2.9 | 100 | 52 | 15 | 45 |

EXAMPLE VI

This example illustrates one of the embodiment of the invention, namely, the employment of methanol or trimethylborate in the pyrolysis stage of the reaction and the advantages resultant therefrom.

To a vertical 18 inches × 1 inches Pyrex pyrolysis tube encased in a furnace and packed with 0.3-inch diameter glass beads and fitted at its upper end with an addition funnel and its lower end with a first flask located in an ice bath having a nitrogen gas outlet sidearm associated with a cold trap, said pyrolysis tube further fitted in its upper region with a sidearm fitted into a second flask, said second flask fitted with a nitrogen gas inlet tube. The pyrolysis column is heated in the range of 350° to 400° C. and dry nitrogen was passed therethrough for a purge of the formed n—$C_{10}$-$C_{13}$ alkenes.

A mixture of n—$C_{10}$-$C_{13}$ alkylborate esters (ROBO) and methanol (MeOH) or said esters and trimethylborate (TMB) was added dropwise at the top of the pyrolysis tube from the addition funnel over a 40-minute period and the resultant n—$C_{10}$-$C_{13}$ alkenes were recovered in said first flask. At the end of each run the pyrolysis tube was inspected for its condition. The test data and results are reported below in table III for various runs employing the above procedure.

TABLE III

| Run No. | Additive | Mole ratio ROBO additive | Column temp., °C. | $N_2$ flow, cc./min. | Pyrolysis column condition at end of run |
|---|---|---|---|---|---|
| L | MeOH | 1:5 | 400 | 50 | Clean. |
| M | MeOH | 1:1 | 350 | 200 | Do. |
| N | None | None | 350 | 50 | 2" band of hard packed $B_2O_3$ band at entrance. |
| O | TMB | 1:1 | 350 | 50 | Clean. |
| P | TMB | 5:1 | 350 | 50 | 1" $B_2O_3$ band at entrance. |
| Q | TMB | 2:1 | 400 | 50 | Clean. |
| R | MeOH | 1:1 | 400 | 50 | Do. |

The foregoing date demonstrate the unexpected suitability of methanol and trimethylborate in preventing undesirable plugging in the pyrolysis reaction as well as employing an alkylborate to methanol or trimethyborate in the manner defined.

EXAMPLE VII

This example further illustrates the method of the invention.

To a 6,000 gallon glass, stirred oxidation reactor maintained at a temperature of 175° C. there was charged 28,000 lbs./hr. of $C_{10}C_{14}$ n-paraffin and 1400 lbs./hr. of boric acid. The tank was maintained at 175° C. while air at 140,000 SCFH was introduced. From the bottom of the oxidation reactor which was maintained at atmospheric pressure there was continuously withdrawn 29,000 lbs./hr. of n—$C_{10}$—$C_{14}$ alkyborate containing liquid reaction mixture, said mixture having an average residence time of about 1 hour. The withdrawn reaction mixture was passed to a second stirred tank identical to and maintained under the same conditions as the first stirred tank, the average residence time also being an hour. The withdrawn mixture was passed to a vacuum stripper at a rate of 24,600 lbs./hr., maintained at 100° C. under 5 mm. Hg pressure and n—$C_{10}$ to $C_{14}$ alkylborate was withdrawn from the bottom thereof and unreacted n-paraffin plus nonborated volatiles were withdrawn as overhead at a rate of 24,600 lbs./hr. and passed through a platinum on kieselguhr filled hydrogenator maintained at 400° C. at a rate of 24,600 lbs./hr. Regenerated n-paraffin was withdrawn from said hydrogenator and forwarded to n-paraffin storage for reuse. From the bottom of said vacuum stripper there was withdrawn at a rate of 4,400 lbs./hr. crude n—$C_{10}$—$C_{14}$ alkylborates which were combined with trimethylborate (TMB) in a mole ratio of alkylborate to TMB of 2:1, the resultant borate mixture being charged to a 1,000 ft.³ vertical pyrolysis reactor packed with glass sphere and flushed with nitrogen, said pyrolysis reactor maintained at a temperature of about 250° C. Crude n—$C_{10}$—$C_{14}$ alkenes, borate esters and other products were withdrawn at a rate of about 5,500 lb./hr. After hydrolysis, phase separation and silica gel treatment purified n—$C_{10}$—$C_{14}$ alkenes were forwarded to storage.

We claim:

1. A method of producing from a member selected from the group consisting of n-alkane and cycloalkane of from six to 20 carbons, a corresponding alkene comprising first contacting in an oxidation zone said member with oxygen and a boric acid selected from the group consisting of orthoboric acid and metaboric acid at a temperature between about 150° and 200° C. utilizing a mole ratio of said member to boric acid of between about 15:1 and 2:1 and a mole ratio of said member to oxygen of between about 1:10 and 10:1, separating the nonborated products from the formed alkylborate, hydrogenating nonborated products in a hydrogenation zone, pyrolyzing said separated alkylborate in an inert atmosphere at a temperature between about 200° and 400° C. in the presence of a member selected from the group consisting of methanol and trimethylborate in a ratio of said alkylborate to a member of between about 1:10 and 10:1, contacting the formed crude alkene resulting from the pyrolysis mixture with silica gel, recovering essentially oxygenate free alkene therefrom, contacting said silica gel with a solvent selective for oxygenate byproducts and recovering the enriched oxygenate solvent solution, separating said solvent from said solution, passing the oxygenate residue to said hydrogenation zone, recycling the products of said hydrogenation zone to said oxidation zone.

2. A method of preparing a member selected from the group consisting of n-alkene and cycloalkene from six to 20 carbons from an alkane selected from the group consisting of n-alkane and cycloalkane of corresponding carbon length comprising first contacting said alkane simultaneously with an oxygen containing gas and a boric acid selected from the group consisting of orthoboric and metaboric acid at a temperature of between about 150° and 200° C., utilizing a mole ratio of paraffin to boric acid of between about 15:1 and 2:1 and a mole ratio of paraffin to oxygen of between about 2:10 and 10:1, recovering formed alkylborate from said reaction mixture, pyrolyzing said recovered alkylborate in an inert atmosphere at a temperature between about 200° and 400° C. in the presence of an additive selected from the group consisting of methanol and trimethylborate utilizing a mole ratio of alkylborate to additive of between about 1:10 and 10:1, and recovering said member.

3. A method in accordance with claim 2 wherein said member is continuously recovered from the pyrolysis mixture via fractional distillation followed by contacting the distilled n-alkene with silica gel and separating said n-alkene therefrom.

4. A method in accordance with claim 2 wherein said n-paraffin is a mixture of $C_{10}$ to $C_{13}$ n-paraffin, said n-alkene is a mixture of $C_{10}$ to $C_{13}$ n-alkenes, said additive is methanol, and said inert atmosphere is nitrogen.

5. A method in accordance with claim 2 wherein said n-paraffin is a mixture of $C_{10}$ to $C_{13}$ n-paraffin, said n-alkene is a mixture of $C_{10}$ to $C_{13}$ n-alkenes, said additive is trimethylborate, and said inert atmosphere is nitrogen.

6. A method in accordance with claim 2 wherein said n-paraffin is n-dodecene, said alkene is a mixture of n-dodecene and said inert atmosphere is nitrogen.

7. A method in accordance with claim 2 wherein said n-paraffin is a mixture of $C_{10}$ to $C_{13}$ n-alkanes, said n-alkene is a mixture of n—$C_{10}$ to $C_{13}$ alkenes and said inert atmosphere is nitrogen.

* * * * *